Feb. 22, 1955　　　M. IRWIN ET AL　　　2,702,568
SAW BLADE CLEANING DEVICE
Filed Dec. 8, 1950　　　　　　　　　　　　2 Sheets-Sheet 1
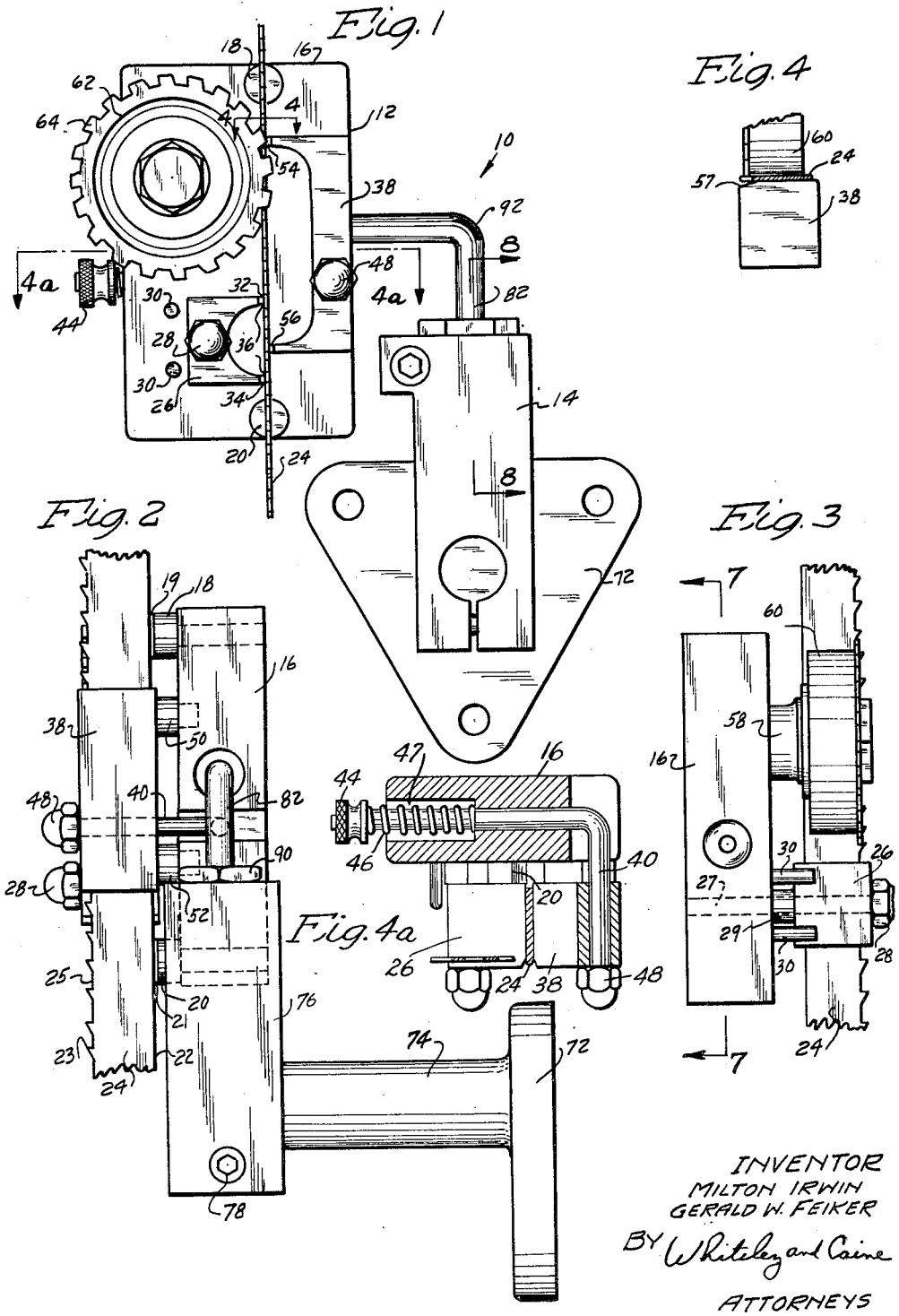
INVENTOR
MILTON IRWIN
GERALD W. FEIKER
BY Whiteley and Caine
ATTORNEYS Feb. 22, 1955　　　M. IRWIN ET AL　　　2,702,568
SAW BLADE CLEANING DEVICE
Filed Dec. 8, 1950　　　　　　　　　　　　2 Sheets-Sheet 2
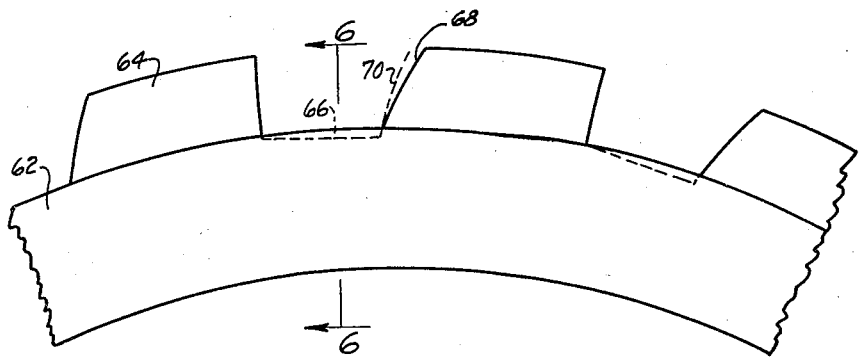
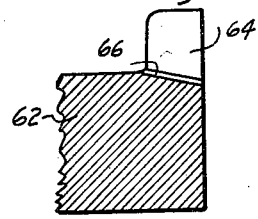
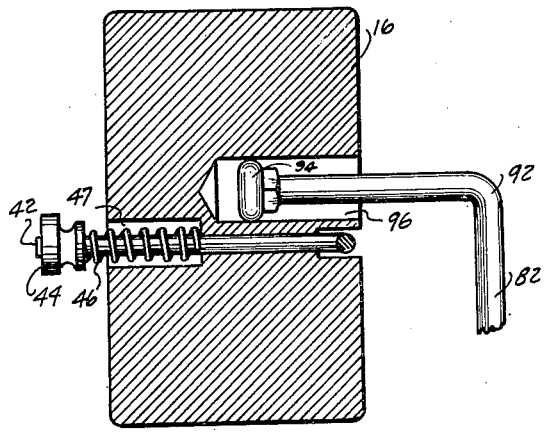
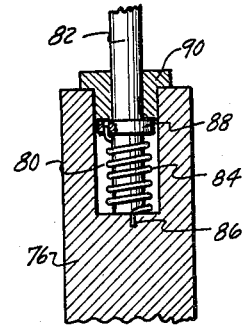
INVENTOR
MILTON IRWIN
GERALD W. FEIKER
BY Whiteley and Caine
ATTORNEYS United States Patent Office 2,702,568
Patented Feb. 22, 1955

2,702,568
SAW BLADE CLEANING DEVICE

Milton Irwin and Gerald W. Feiker, Minneapolis, Minn.

Application December 8, 1950, Serial No. 199,798

7 Claims. (Cl. 143—158)

Our invention relates to improvements in a saw blade cleaning device. In general the invention is concerned with a device for removing residual material from a saw blade so as to prevent redepositing said material on freshly cut surfaces of the substance being cut. More particularly, the device is intended for use with a power driven band saw blade that is used for cutting meat, and the purpose of the cleaning device is to substantially completely remove fragments of fat, tissue and bone from the saw blade after it has passed through the meat, to prevent redepositing these materials on a freshly cut surface of the meat as the saw blade continues its circuitous movement.

For some time it has been recognized that a considerable saving in labor costs could be effected in packing houses or wholesale and retail meat establishments if carcasses or large pieces of meat could be cut into the desired portions by the use of a band saw which would perform the operation of cutting the meat as well as the bony portions. The problem which arises in cutting meat in this manner is that as the saw blade passes through the meat it carries a residual portion of fat, tissue and bone which is deposited on the freshly cut surfaces of the meat, which deposit is not only unsightly but reduces the salability of the final product. Removing the residual fragments from the saw blade has been a serious problem which in the past has defied satisfactory solution because of the numerous factors involved. The saw teeth are usually spaced about one-fourth of an inch apart along the active edge of the saw blade and these teeth are somewhat chisel-shaped and are set at a slight angle from the true plane of the blade. As the teeth proceed through the meat they tend to tear the tissue, scrape the bony portions and scoop up the fatty material. These several materials combine in the spaces between the teeth to form a plastic greasy adhering mass, which, as the spaces between the teeth become filled, is transferred to the sides of the blade. If no suitable means is provided for continuously cleaning the saw blade, the residual deposits are thereafter transferred to the freshly cut meat surfaces and will leave a streak of tissue across the fatty surfaces as well as portions of the fat and bone across the tissue surfaces. The deposit is not only unsightly but it causes subsequent darkening of the cut surfaces and hastens the spoilage of the meat. While it is possible to scrape some of the deposit from the cut surface, this defeats the purpose of the operation because it is time-consuming and is never completely effective in removing all of the deposits because some of the deposits become absorbed in the pores of the freshly cut surface. Furthermore, when a power saw is used on different varieties of meat, such as beef, pork, lamb and the like, it is essential that the blade be thoroughly cleaned to prevent contamination of the different forms of meat. In the case if fish, the saw blade must be completely cleaned before it can be again used on meat of any form. As a result of the difficulties encountered, power saws have not been accepted in the meat industry as a suitable labor-saving device which is in general use.

The difficulties set forth hereinbefore have long been recognized in the prior art and several forms of saw blade cleaners have been evolved and which include scrapers, brushes and revolving disks of various types. Scrapers invariably involve some form of springy material directed at an obtuse angle to the saw blade. As both the blade and the scraper will flex to a variable degree, the relationship is constantly varying, and in time the scraping edge becomes rounded, permitting deposits to collect that continuously wipe against the blade leaving a smear that is transferred to the freshly cut surfaces. Brushes are ineffective because they are incapable of satisfactorily cleaning the lateral surfaces of the blade, and moreover in the instance of saw blades used on meat, the residual deposit cannot be continuously removed from the bristles of the brushes so that the bristles soon become clogged and are useless. Revolving disks provide a satisfactory manner of cleaning the sides of the saw blade, but they are ineffective for removing residual material carried in the spaces between the saw teeth. To be effective, a saw blade cleaner must not only be capable of cleaning the sides of the blade but it must also be capable of cleaning the spaces between the teeth, and in the instance of saw blades of the type used for cutting meat, substantially 100,000 saw teeth pass a given point every minute and, therefore, it will be recognized that satisfactory cleaning between the saw teeth poses a difficult problem.

In the present invention we have provided a saw blade cleaning device which is more particularly intended for use with continuous band saw blades, and that has successfully combined all of the desirable characteristics for cleaning residual material from a saw blade while the same is in motion and immediately after it has passed in cutting relationship with a substance being cut, and is particularly applicable to meat and meat products. The device includes a supporting member which is carried by the saw casing and is normally positioned to engage a part of the saw blade after it has passed through the substance being cut. The support furnishes a surface for engaging the rear smooth inactive surface of the blade, and it also carries other elements for cleaning the blade. Suitably mounted on the support on either side of the path of movement of the blade are a pair of scrapers that are adapted to laterally engage the wide surfaces of the blade with flat surfaces that bear transversely against the sides of the blade and extend above the cutting edges of the blade. Each of the scraper members is of a generally U-shaped configuration so as to provide two contacting surfaces that scrape the blade. The upper extremities of each of the contacting surfaces is slightly beveled so as to avoid contact with the set of saw teeth. Both of the U-shaped members are pivotally supported for slight rotative movement so that they can follow the flexure or camber of the saw blade. One of the U-shaped members is resiliently joined to the support so as to bias the member against one side of the blade and to hold the several scraping or contacting surfaces of the two members in direct contact with the blade. Also mounted on the support is a freely rotatable pinion whose gear-like teeth extend transversely across the path of the blade so as to laterally intermesh with the saw teeth. The pinion has its gear teeth of a size to fit into the spaces between the saw teeth so that the movement of the blade effects rotative movement of the pinion. In order that the gear teeth of the pinion may freely separate from the saw teeth of the blade, the rear contacting edges of the pinion teeth are formed in a smooth continuous curve which is slightly greater than the normal curve that would exist in a tightly fitting rack and gear arrangement. The pinion is positioned with respect to one of the contacting edges of one of the scrapers so that residual material carried in the spaces between the saw teeth will be laterally pushed out against the contacting edge of the scraper just as each of the pinion teeth recedes from the space between two saw teeth. Since the saw blade will have a certain amount of flexure during its rapid movement, the support is floatingly mounted for freedom of movement in several directions by a connection which acts in a manner similar to a sliding gimbal mount.

The purpose of the cleaning device is to effectively clean substantially all of the residual material from both sides of the blade as well as from the surfaces between the saw teeth while the saw blade is in rapid movement. The cleaning device is relatively silent in its operation, it does not substantially impede the operation of the blade, and it will maintain accurate alignment with the blade under all conditions. In view of the fact that such a device must be cared for by relatively unskilled persons, it is simple to disassemble for cleaning purposes and when reassembled all of the operative parts will remain in correct alignment with each other so as to maintain efficient operation.

This application constitutes a modification of a saw blade cleaning device shown in our prior application Ser. No. 29,487 filed May 27, 1948, issued August 12, 1952, as Patent No. 2,606,578.

An object of the invention is to provide a saw blade cleaning device which embodies means for effectively dislodging and removing residual material from a moving saw blade.

Another object is to provide means for simultaneously cleaning both lateral sides of a saw blade as well as the spaces between the saw teeth while the blade is in movement.

Another object is to provide in a saw blade cleaning device a pinion member positioned to mesh with the saw teeth to dislodge residual material from the spaces between the teeth together with a member positioned on the opposite side of the saw blade for holding the blade in engagement with the pinion teeth and also to collect and dispose of the dislodged material.

Another object is to provide in a device for cleaning a band saw blade, a support having means for engaging the smooth inactive rear edge of the blade together with a pair of pivotally mounted U-shaped members for engaging the opposite sides of the blade, and a pinion which laterally meshes with the saw teeth and cooperates with one of the U-shaped members to form a highly practical means of efficiently cleaning a saw blade.

A further object is to provide in combination with a device for cleaning both sides of a saw blade as well as the spaces between the saw teeth, together with a floating connection which will permit the cleaning device to follow minor distortions of the blade.

Other and further objects may become apparent from the following description and claims, and in the appended drawings in which:

Fig. 1 is a plan view of a saw blade cleaning device which is shown in its relationship with a fragmentary portion of a band saw blade;

Fig. 2 is a right side elevation of the structure shown in Fig. 1;

Fig. 3 is a left side view of a portion of the structure shown in Fig. 1;

Fig. 4 is a detail view taken on line 4—4 of Fig. 1, looking in the direction of the arrows;

Fig. 4a is a sectional view taken on line 4a—4a of Fig. 1;

Fig. 5 is a greatly enlarged view of a portion of the underside of a pinion shown in Fig. 1;

Fig. 6 is a sectional view taken on line 6—6 of Fig. 5;

Fig. 7 is a sectional view taken on line 7—7 of Fig. 3; and,

Fig. 8 is a sectional view taken on line 8—8 of Fig. 1.

Referring now to the several views of the drawing, the invention will be described in detail. General reference numeral 10 indicates the entirety of a saw blade cleaning device composed of a first assembly indicated by general numeral 12 which provides for cleaning a saw blade, and a second assembly indicated by the general reference numeral 14 which suitably supports the assembly 12.

Referring now to the assembly 12, reference numeral 16 indicates a supporting member which takes the form of a rectangular block. As best seen in Figs. 1 and 2, a pair of studs 18 and 20 are threadedly mounted into one surface of the supporting member 16, and these studs on their outer ends are provided with smooth extremely hard wear-resistant surfaces 19 and 21. Since the studs 18 and 20 are threadedly mounted into the support 16, the surfaces 19 and 21 are adjustable to the extent that suitable washers, not shown, may be inserted beneath the heads of the studs to space the same with relation to the support 16. The contacting surfaces 19 and 21 are accurately machined and provide a smooth surface for engaging the rear inactive edge 22 of a saw blade 24 which has the usual cutting teeth 23 that are longitudinally spaced with relation to each other so as to provide spaces 25.

As best seen in Figs. 1 and 3, a first bifurcated or U-shaped member indicated at 26 is supported for axial movement on a pin 27 that extends into the support 16 and is held by a nut 28. A collar 29 holds member 26 in spaced relation to support 16 and facilitates axial movement of member 26. A pair of pins 30 extend vertically into the support 16 in rear of member 26 to limit the axial movement of the member. The bifurcated arms of member 26 are provided with scraping surfaces 32, 34 and, as will be evident on examination of Fig. 1, the upper edges of the scraping surfaces 32, 34 are slightly beveled as indicated at 36 so as to avoid contact with the set of the saw teeth 23. Also mounted on support 16 is a second scraper member 38 which is also of a generally U-shaped configuration but whose arms are spaced a substantially greater distance apart than the arms of member 26. Member 38, as best seen in Fig. 2, is pivotally supported on an angularly shaped rod 40, which, as shown in Fig. 7, extends transversely through the center of support 16. As best seen in Fig. 7, the lower outer end of rod 40 is threaded at 42 to receive a thumb screw 44 which operates against a coil spring 46 embedded within a chamber 47 in the support 16. Member 38 is secured at its upper end on rod 40 by a nut 48. A pair of studs 50 and 52, which are best seen in Fig. 2, form supports for the opposite arms of the member 38. Each of the arms of member 38 is provided with a flat contacting surface 54, 56 that are adapted to engage a side of the saw blade 24 on a side opposite from member 26 and the contacting surfaces 54, 56 extend slightly above the edge of the saw blade and are slightly beveled as indicated at 57 in Fig. 4. As best seen in Figs. 1 and 3, a base member 58 extends into the support 16 and supports a wheel 60. On the upper extremity of wheel 60 and integrally united thereto is a pinion gear 62 having spaced relatively broad teeth indicated at 64.

Referring now to Fig. 5 is shown a reverse view of the gear disclosed in Fig. 1. As here disclosed, the gear rotates in a clockwise direction and a detailed discussion of the structure follows. In order that the pinion teeth may avoid contact with the angular set of the saw teeth, a slight taper indicated at 66 is gouged out of the periphery of the wheel 60 and extends in the direction of the lower edge of the wheel. The gear teeth 64 are also provided with a sloping rear surface 68 which is greater than a normally involute curve indicated by the dotted line 70. The purpose of curve 68 is to permit the gear teeth 64 to readily separate themselves from the saw teeth and without injury to the saw teeth.

Referring again to Fig. 1, the supporting structure indicated by general reference numeral 14 includes a bracket plate 72 which is adapted to be mounted at any suitable place on a saw casing. As best seen in Fig. 2, a rod 74 which is integrally united to bracket 72 carries a block 76 on its outer end which is secured to the rod 74 by means of a set screw 78. As seen in Fig. 8, towards its upper end block 76 is provided with a cavity 80, within which extends one end of a rod 82, that is resiliently held within the cavity 80 by means of a coil spring 84, one end of which engages in the block 76, as indicated at 86, and the other end of which extends about a collar 88 on rod 82. A bushing 90 holds the assembly within block 76.

Referring to Fig. 1, in conjunction with Fig. 7, the upper end of rod 82 is angularly bent at 92 and has on its outer end a spheroid member 94 which is shown as an ellipsoid but may, if desired, be a sphere. Member 94 loosely extends into a cavity 96 in the support 16 and provides a sliding, loose fitting floating connection between the assemblies 12 and 14.

The operation of the device will now be described. The supporting assembly 14 is suitably mounted at a convenient place on a saw casing and preferably at a short distance beyond the point where the cutting operation has taken place. The cleaning assembly 12 is merely slid over the spheroid 94 on the rod 82 and the further function of this connection will be discussed hereinafter. The saw blade 24 is illustrated as moving away from the reader, and in actual practice it may be moving in a downwardly direction, or the cleaning assembly 12 may, if desired, be mounted on a rear portion of the band saw blade where the blade is actually moving upwardly as shown in the drawing. By pressing inwardly on the thumb screw 44, rod 40 is moved to the right, as shown in Fig. 7, against the resilience of spring 46 so as to move the U-shaped member 38 to the right to permit the structure to be inserted about the band saw blade with member 38 on one side of the blade, and member 26 on the other side of the blade, as clearly shown in Fig. 1. When the thumb screw is released, spring 46 will expand and bring member 38 into contact with one side of the saw blade so as to hold the blade in contact with member 26 and with the saw teeth 23 laterally intermeshing with the pinion teeth 64. When this is accomplished the saw is ready for use, and in operation the saw blade will move in an upward direction, as shown in Fig. 1. As the blade passes through the substance to be cut, and insofar as this discussion is concerned, said substance will be regarded as a piece of meat, however, this does not constitute a limitation of the use of the structure. The saw teeth 23 which are alternately staggered at a very slight angle will collect minor fragments of tissue, fat and bone which form a composite adhesive mass that will lodge in the spaces 25 between the saw teeth 23 as well as slightly smearing the opposite lateral sides of the blade. The function of the cleaning device is to completely remove residual material carried on the sides of the blade, as well as a relatively larger proportion of the deposits which become lodged between the saw teeth. Members 26 and 38 are pivotally mounted on the support 16 and are free to rotate about the axes of rods 27 and 40, but their scraping surfaces 32, 34, 54 and 56 are in a plane with the sides of the saw blade and will contact the blade at a 90° angle. Members 26 and 38 are formed of a highly tempered steel or other extremely hard alloy having wear-resistant surfaces whose edges are relatively sharp and will be maintained in such a condition by the direct 90° angle contact with the saw blade. The four scraping surfaces 32, 34, 54, 56 will adequately remove residual material carried on the sides of the blade, and since these members are spaced upwardly from the support 16 by collar 29 and the spacers 50, 52, material will be forced inwardly towards the surface of the support 16 where it can fall by gravity into a suitable container. The upper beveled edges 36 and 57 extend above the set of the saw teeth 23 and will remove residual material carried on the edges of the teeth but without contacting the sides of the teeth. It will be particularly noted that the lower arm of member 38, as seen in Fig. 1, engages the saw blade at a point which is exactly intermediate the arms of member 26 so that the saw blade is held directly in contact with the arms of member 26 on one side, and with the arms of member 38 on the other side and minor lateral movement of the blade will not alter this relationship. After the blade has been contacted by two portions of member 26 and one portion of member 38, the pinion teeth 64 laterally intermesh with the saw teeth to dislodge material carried between the teeth. The pinion 62 is freely rotatably and is driven by the movement of the saw blade. As shown in Fig. 5, the rear edges of the gear teeth 64 against which the pushing action is exerted have been curved as indicated at 68 so as to permit the gear teeth 64 to freely recede from the saw teeth 23 and the slanting recess 66 will prevent injury to the set of the saw teeth. As the pinion rotates and forces the material laterally towards the center of member 38, the teeth 64 begin to recede so that at the point of the contacting surface 54, each gear tooth has moved away from the saw blade only sufficient to permit a clean scraping action of residual material by the arm of the member 38. The hardened surfaces 19 and 21 of the studs 18 and 20 provide a wear-resistant sliding surface which will hold the saw blade in a relatively fixed position with respect to the cleaning surfaces, but will not prevent lateral flexure of the blade. Thus the blade is prevented from moving away from the support by its contact with the surfaces 19 and 21 and pinion gear 62, but it is permitted to laterally flex by reason of the resilient connection of rod 40 and the pivotal mounting of members 26 and 38.

The function of the supporting mechanism 14 is to permit movement of the support 16 in any one of several directions on member 94, whereas the coil spring 84 will bias rod 82 to hold the support 16 against the rear edge 22 of the saw blade.

The parts of the structure can be easily disassembled for cleaning purposes with the use of simple tools and may be reassembled by relatively unskilled persons and with all of the parts assuming an accurate operative position.

The principal advantage of our invention resides in providing a cleaning device for saw blades which will remove substantially all of the residual material so as to prevent redepositing the same on the cut surfaces with the next passage of the blade.

Another advantage resides in the accurate alignment of parts and their cooperative action to assure a highly efficient cleaning operation, without injury to the saw blade.

Another advantage resides in providing a device which is relatively simple, and needs no other care than ordinary cleaning, which may be performed by relatively unskilled persons.

Our invention is defined in the terms of the appended claims.

We claim:

1. A saw blade cleaner, comprising a support, abutting means carried by the support and forming a path for engaging the smooth rear edge of a band saw blade, a first U-shaped member carried by said support at one lateral side of the abutting means, said member having its arms extending transversely to the path of the blade, a pinion mounted on said support on the same lateral side of the abutting means as said U-shaped member and having its peripheral teeth extending transversely across the path of the saw teeth to laterally intermesh with the saw teeth, a second U-shaped member carried by said support on the opposite lateral side of the abutting means, one arm of the second member projecting in the direction of the space between the arms of the first U-shaped member, the other arm of the second member projecting in the direction of the periphery of the pinion as the latter recedes from the saw blade, pivotal means connecting each of said U-shaped members with the support for axial rotation of the members in a plane parallel to the support, and means for biasing said second U-shaped member in the direction of the first U-shaped member and the pinion.

2. A saw blade cleaner, comprising a support adapted to be positioned adjacent a band saw blade, a circular disk mounted for rotation on said support and laterally engaging one side of the saw blade behind its cutting teeth, a pinion secured to said disk on the side opposite the support with its peripheral teeth extending transversely through the path of the saw teeth to intermesh with said teeth and rotate with linear movement of the saw teeth and remove material lodged in the spaces between the saw teeth, each of the teeth of the pinion having a curved rear edge which slopes away from the pinion in an involute curve to permit the gear teeth to tangentially separate from the saw teeth as the pinion is rotated, a rigid scraper carried by said support on the opposite lateral side of the path of the blade and engaging the saw blade at an angle of 90 degrees at a point where the teeth of the pinion recede from the saw teeth, said scraper extending outwardly from the support beyond the edge of the saw teeth and bevelled from the set of the teeth so as to clear the teeth, and resilient means operatively connected between the support and the scraper for biasing the scraper against the disk to resiliently hold the blade between the scraper and the disk.

3. A saw blade cleaner, comprising a support adapted to be positioned adjacent a band saw blade, a rigid scraper carried by said support on one side of the path of the blade and laterally engaging the saw blade, a circular disk mounted for rotation on said support on the same side of the path of the blade as said scraper and laterally engaging the side of the blade behind its cutting teeth, a pinion secured to said disk on the side opposite the support with its peripheral teeth extending transversely through the path of the saw teeth to intermesh with said teeth and rotate with linear movement of the saw teeth and remove material lodged in the spaces between the saw teeth, each of the teeth of the pinion having a curved rear edge which slopes away from the pinion in an involute curve to permit the gear teeth to tangentially separate from the saw teeth as the pinion is rotated, a second rigid scraper of substantially U-shape carried by said support on the opposite lateral side of the path of the blade with one of its arms engaging the blade opposite the first named scraper and its other arm engaging the blade at a point where the teeth of the pinion recede from the saw teeth, the outer edges of each of said scrapers extending outwardly from the support above the edge of the saw teeth and bevelled from the set of the teeth so as to clear the teeth, and resilient means operatively connected between the support and the second scraper for biasing the latter against the disk and the first named scraper to resiliently hold the blade in contact with said scrapers and the pinion teeth.

4. A saw blade cleaner, comprising a support, a circular disk mounted for rotation on said support and adapted to laterally engage one side of a saw blade behind its cutting teeth, a pinion secured to said disk on the side opposite the support and having its peripheral teeth extending laterally across the path of the saw teeth to laterally intermesh with the saw teeth, a first U-shaped member carried by said support at one side of the disk with the outer ends of its arms extending in the direction of the saw blade to engage the same side of the blade as the disk, a second U-shaped member carried by said support with the outer end of one arm extending in the direction of the blade intermediate the arms of the first U-shaped member and its other arm extending in the direction of the disk adjacent the area where the pinion teeth recede from the blade teeth, and resilient means operatively connected to the second U-shaped member and biasing the same in the direction of the first U-shaped member.

5. A saw blade cleaner, comprising in combination, a first support adapted to be positioned adjacent a saw blade, a circular disk mounted for rotation on said support to laterally engage a side of the saw blade behind its cutting teeth, a pinion secured to said disk on the side opposite the support and having its peripheral teeth extending laterally across the path of the saw blade to laterally intermesh with the saw teeth, a rigid scraper carried by the support on the opposite lateral side of the saw blade and holding the blade in contact with the disk and the pinion teeth, a second support adapted for attachment to a wall surface adjacent the saw blade, a rod extending from said second support in the direction of the first support, pivotal means united to the outer end of said rod forming a loose connection between said rod and the first support, and resilient means connecting the inner end of said rod and the second support and acting through the rod to hold the first support in floating relationship with the saw blade to permit the scraper and pinion to move with the saw blade and maintain the pinion teeth in contact with the saw teeth.

6. A saw blade cleaner for removing residual material from a saw blade, comprising a support adapted to be positioned adjacent a saw blade, a first U-shaped cleaning member carried by said support at one side of the path of the blade with the outer ends of its arms formed with flat contacting surfaces engaging one side of the blade, a second U-shaped cleaning member carried by the support on the opposite side of the path of the blade with the outer ends of its arms formed with flat contacting surfaces engaging the other side of the blade, at least one arm of the first U-shaped member engaging the side of the blade at an area between the opposite arms of the second U-shaped member, each of said members extending outwardly from the support beyond the edge of the saw teeth and bevelled from the saw teeth so as to clear the teeth, means resiliently connecting the support and one of said U-shaped cleaning members to bias said member in the direction of the blade and the other cleaning member, and independent pivotal means extending from the support to each of said members between the opposite arms of said members and forming independent rotative connections for each of said members permitting movement of both of said members with flexure of the blade and maintaining a balanced condition between the opposite arms of each of said members and the saw blade to assure complete removal of residual material from the sides of said blade.

7. A saw blade cleaner, comprising in combination, a first support adapted to be positioned adjacent a saw blade, a circular disk mounted for rotation on said support to laterally engage a side of the saw blade behind its cutting teeth, a pinion secured to said disk on the side opposite the support and having its peripheral teeth extending laterally across the path of the saw blade to laterally intermesh with the saw teeth, a rigid scraper carried by the support on the opposite lateral side of the saw blade from the disk and holding the blade in contact with the disk and the pinion teeth, a second support adapted for attachment to a surface adjacent the saw blade, a rod extending between the first and second supports and having a loose sliding gimbal-like connection with one of said supports, and resilient means connecting said rod and the second support and acting through said rod to hold said first support in floating relationship with the saw blade to permit the scraper and the pinion to move with the saw blade and maintain the pinion teeth in contact with the saw teeth.

References Cited in the file of this patent

UNITED STATES PATENTS

| Number | Name | Date |
|---|---|---|
| 360,878 | Harris | Apr. 12, 1887 |
| 395,797 | Perry | Jan. 8, 1889 |
| 1,054,738 | Wright | Mar. 4, 1913 |
| 1,446,108 | Vernon | Feb. 20, 1923 |
| 1,454,735 | Hamlin | May 8, 1923 |
| 1,539,958 | Rush | June 2, 1925 |
| 1,549,407 | Edwards | Aug. 11, 1925 |
| 1,778,053 | White | Oct. 14, 1930 |
| 1,784,696 | Lehmbeck | Dec. 9, 1930 |
| 2,081,033 | Biro | May 18, 1937 |
| 2,135,488 | Baker | Nov. 8, 1938 |
| 2,261,816 | Williams | Nov. 4, 1941 |
| 2,606,578 | Irwin et al. | Aug. 12, 1952 |